United States Patent
Yoon et al.

(10) Patent No.: US 11,271,256 B2
(45) Date of Patent: Mar. 8, 2022

(54) EXTERNALLY MODE-SWITCHABLE BATTERY PACK AND METHOD FOR EXTERNALLY SWITCHING MODE OF BATTERY PACK

(71) Applicant: LG CHEM, LTD., Seoul (KR)

(72) Inventors: Sung Won Yoon, Daejeon (KR); Doe Gyun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 133 days.

(21) Appl. No.: 16/739,327

(22) Filed: Jan. 10, 2020

(65) Prior Publication Data

US 2021/0218070 A1    Jul. 15, 2021

(51) Int. Cl.
| | |
|---|---|
| *H01M 10/42* | (2006.01) |
| *H01M 10/44* | (2006.01) |
| *H01M 10/48* | (2006.01) |
| *H01M 50/581* | (2021.01) |

(52) U.S. Cl.
CPC ......... *H01M 10/425* (2013.01); *H01M 10/44* (2013.01); *H01M 10/48* (2013.01); *H01M 50/581* (2021.01); *H01M 2010/4271* (2013.01)

(58) Field of Classification Search
CPC .... H01M 10/425; H01M 10/44; H01M 10/48; H01M 50/581; H01M 2010/4271
USPC ....................................................... 320/127
See application file for complete search history.

(56) References Cited

U.S. PATENT DOCUMENTS

| | | | |
|---|---|---|---|
| 10,336,196 B2 | 7/2019 | Nakamoto et al. | |
| 2014/0176076 A1* | 6/2014 | Momo | H01M 10/0583 320/128 |
| 2018/0062150 A1 | 3/2018 | Kim | |
| 2018/0115178 A1* | 4/2018 | Moon | G01R 31/3835 |
| 2020/0014077 A1* | 1/2020 | Tabatowski-Bush | H01L 24/49 |

FOREIGN PATENT DOCUMENTS

| | | |
|---|---|---|
| JP | 2014-096975 A | 5/2014 |
| KR | 10-2013-0104149 A | 9/2013 |
| KR | 10-2014-0064097 A | 5/2014 |
| KR | 10-2018-0022162 A | 3/2018 |

* cited by examiner

*Primary Examiner* — Nathaniel R Pelton
(74) *Attorney, Agent, or Firm* — Morgan, Lewis & Bockius LLP

(57) ABSTRACT

A battery pack, comprising: a plurality of battery modules; a battery management system (BMS) controlling charging or discharging of the battery pack; a wake-up control unit controlling wake-up of the BMS; a protection circuit unit protecting the battery pack; and a main field-effect transistor (FET), one end being connected to the protection circuit unit, and another end being connected to a positive output terminal of the battery pack, to control an output of the battery pack in response to control by the BMS, the protection circuit unit comprising a blocking switch, one end being connected to a positive terminal of the plurality of battery modules, another end being connected to the BMS and the main FET, so that the blocking switch is set to an on state and then is turned off upon receiving a blocking signal from the BMS to block the output of the battery pack.

9 Claims, 3 Drawing Sheets

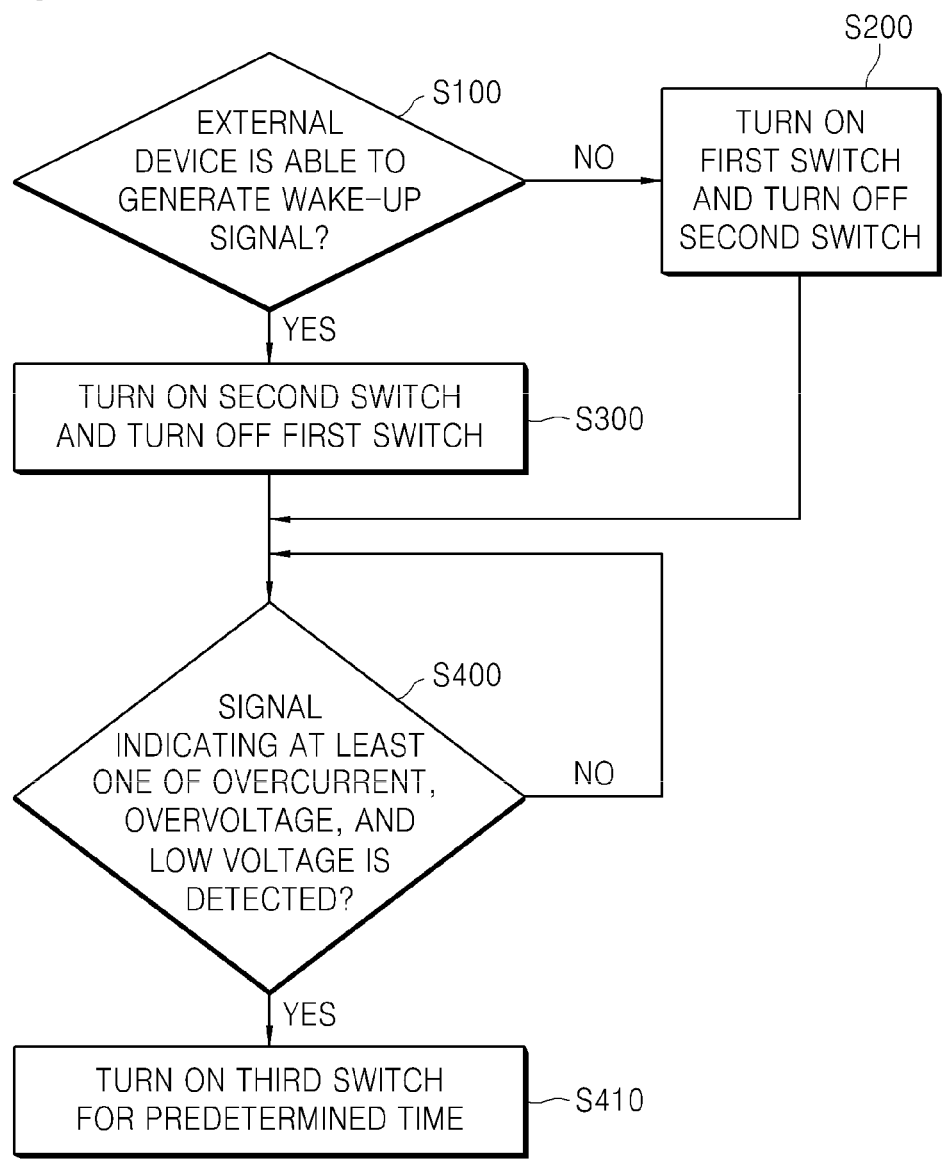

EXTERNALLY MODE-SWITCHABLE BATTERY PACK AND METHOD FOR EXTERNALLY SWITCHING MODE OF BATTERY PACK

TECHNOLOGICAL AREA

The present disclosure relates to an externally mode-switchable battery pack and a method for externally switching a mode of a battery pack.

More particularly, the present disclosure relates to an externally mode-switchable battery pack having a battery in which a switch controlled by an external device is additionally provided, and a method for switching a mode of a battery pack.

BACKGROUND TECHNOLOGY

With an increased use of fossil fuel, the necessity of using alternative energy or clean energy is increasing, and relevant researches are being carried out most actively in the fields of generation of electricity and storage of electricity using electrochemistry. A representative example of an electrochemical device using electrochemical energy may be a battery at the present time, and battery application fields are gradually expanding.

Recently, with the development of technology related to mobile devices such as mobile computers, mobile phones, cameras, and the like and increased demand for such devices, the demand for batteries as energy sources are rapidly increasing. Meanwhile, a battery includes a battery management system. This battery management system may protect a battery by blocking the battery from being discharged when a remaining capacity of the battery has a predetermined value or less. However, the battery management system installed to protect a battery consumes power of the battery, and thus the battery may become unusable if the battery has been left unused for a long period of time.

To resolve such an issue, a technique has been developed, in which an additional power blocking switch is provided so as to prevent consumption of power of a battery by turning off the power blocking switch when the battery is not used for a long period of time and to activate a battery management system again by turning on the power blocking switch when the battery is used (Related Art 1).

That is, according to Related Art 1, a user is required to turn on or off the power blocking switch.

Recently, with the development of technology related to external devices, a technique has been developed, in which power of a battery is automatically blocked according to whether an external device is used in cases when the power of the battery can be controlled by the external device (Related Art 2).

However, the technique of turning on or off a power blocking switch by a user (Related Art 1) and the technique of controlling power of a battery from an external device (Related Art 2) have different circuits, and thus it is required to differently design a battery according to an external device in which a battery is used, causing an increase in the cost of battery design.

Meanwhile, conventional battery packs immediately block an output of the battery packs when the battery packs enter a state of any one of overcurrent, overvoltage, and low voltage, and thus it is not possible to monitor the battery packs after blocking the output.

Therefore, the present disclosure proposes a battery pack which is usable regardless of whether power of a battery can be controlled from an external device. Furthermore, the present disclosure proposes a battery pack which makes it possible to monitor the battery pack during a predetermined time even when the battery pack enters a state of any one of overcurrent, overvoltage, and low voltage.

RELATED ART DOCUMENTS

Patent Documents

Korean Patent Application Laid-open Publication No. 2013-0104149 A
Korean Patent Application Laid-open Publication No. 2018-0022162 A

CONTENTS OF THE INVENTION

Problems to Solve

The present disclosure provides a battery pack which is usable regardless of whether power of a battery can be controlled from an external device.

The present disclosure also provides a battery pack which makes it possible to monitor the battery pack during a predetermined time even when the battery pack enters a state of any one of overcurrent, overvoltage, and low voltage.

Means to Solve the Problems

In accordance with an exemplary embodiment, a battery pack includes: a plurality of battery modules; a battery management system (BMS) configured to control charging or discharging of the battery pack; a wake-up control unit configured to control wake-up of the BMS; a protection circuit unit configured to protect the battery pack from overcurrent, overvoltage, and low voltage; and a main FET, one end of which is connected to the protection circuit unit and another end of which is connected to a positive output terminal of the battery pack so as to control an output of the battery pack in response to control by the BMS, wherein the protection circuit unit includes a blocking switch, wherein one end of the blocking switch is connected to a positive terminal of the plurality of battery modules and another end of the blocking switch is connected to the BMS and the main FET so that the blocking switch is set to an on state and then is turned off upon receiving a blocking signal from the BMS so as to block the output of the battery pack.

The wake-up control unit may include: a first switch, one end of which is connected to the other end of the blocking switch and another end of which is connected to the BMS; a second switch, one end of which is connected to the other end of the blocking switch and another end of which is connected to an external device; and a third switch, one end of which is connected to the one end of the blocking switch and another end of which is connected to the BMS.

When the external device is unable to generate a BMS wake-up signal, the first switch may be set to an on state to provide power to the BMS by connecting the other end of the protection circuit unit and the BMS, and when the external device is able to generate the BMS wake-up signal, the first switch may be set to an off state. The second switch may be turned on upon receiving a BMS wake-up signal from the external device to connect the battery modules and the BMS.

When the output of the battery pack is blocked by the protection circuit unit, the third switch may be controlled by the BMS so as to be blocked after transmitting a diagnosis signal for the plurality of battery modules to the BMS during a predetermined time.

When the BMS is woken up by the wake-up control unit, the BMS may turn on the main FET.

The protection circuit unit may further include a second blocking switch in addition to the blocking switch, wherein one end of the second blocking switch may be connected to a negative terminal of the plurality of battery modules, and another end of the second blocking switch may be connected a negative output terminal of the battery pack.

Effects of the Invention

The present invention provides a battery pack which is usable for the power supply of an external device regardless of whether power of the battery can be controlled from an external device or not.

The present disclosure also provides a battery pack which makes it possible to monitor the battery pack during a predetermined time even when the battery pack enters a state of any one of overcurrent, overvoltage, and low voltage.

BRIEF DESCRIPTION OF THE DRAWINGS

FIG. 3 is a flowchart illustrating a battery pack wake-up method and protection method according to an embodiment of the present disclosure.

DETAILED DESCRIPTION OF EMBODIMENTS

Figure 1:
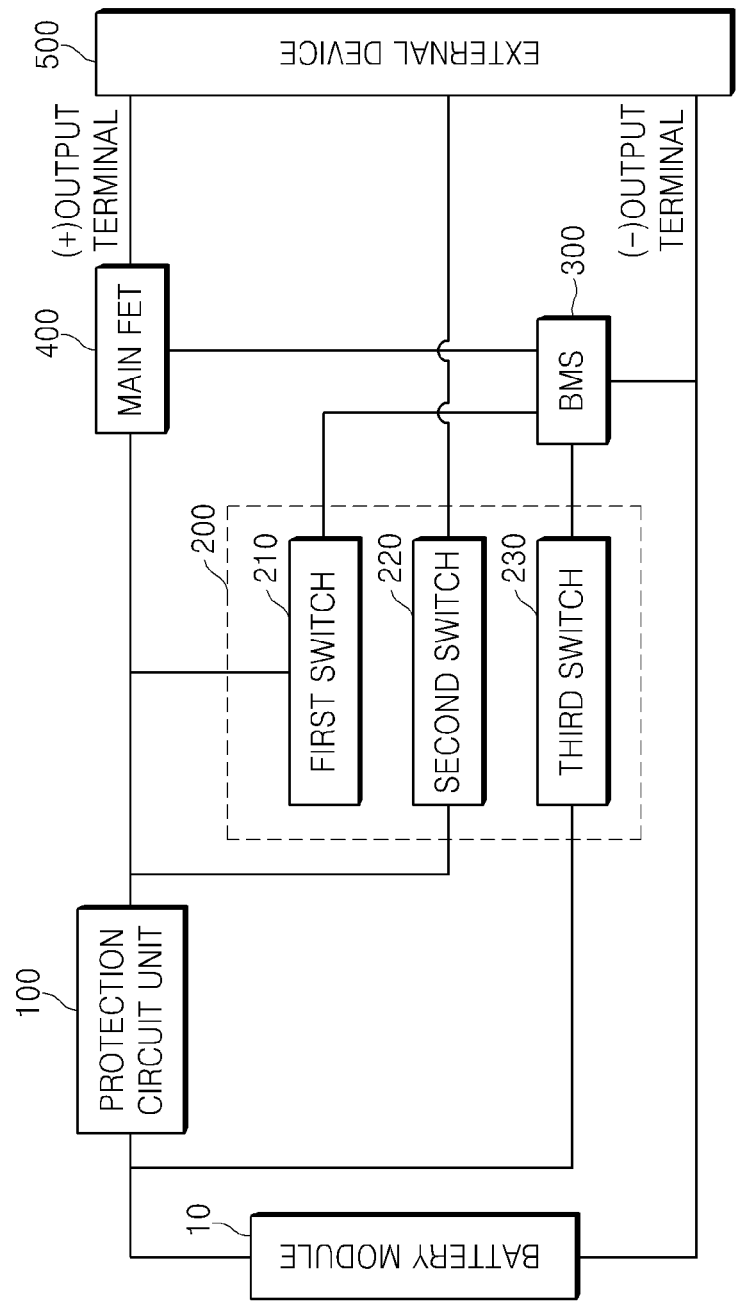
FIG. 1 is a block diagram illustrating a battery pack and an external device according to an embodiment of the present disclosure.

Hereinafter, embodiments of the present disclosure will be described in detail with reference to the accompanying drawings so that those of ordinary skill in the art can easily carry out the present invention. However, the present invention may be implemented in various different forms and is not limited to the embodiments described herein. Some parts of the embodiments, which are not related to the description, are not illustrated in the drawings in order to clearly describe the embodiments of the present disclosure. Like reference numerals refer to like elements throughout the description.

The term "first", "second" or the like may be used for describing various elements but does not limit the elements. Such terms are only used for distinguishing one element from other elements. For example, without departing the scope of the present invention, a first element may be referred to as a second element, and likewise, a second element may be referred to as a first element. The terminology used herein is not for delimiting the present invention but for describing specific embodiments. The terms of a singular form may include plural forms unless otherwise specified.

In the entire description, when one part is referred to as being "connected" to another part, the former may be "directly connected" to the latter or "electrically connected" thereto via an intervening other part. When it is mentioned that a certain part "includes" or "comprises" certain elements, the part may further include other elements, unless otherwise specified. The term "step (ing) . . . " or "step of . . . " used herein does not represent "step for . . . ".

The terms used herein have been selected from among general terms that are widely used at the present time in consideration of the functions of the present invention, but may be changed depending on intentions of those skilled in the art, judicial precedents, or the advent of new technology. Furthermore, specific terms have been arbitrarily selected by the applicant, and the meanings of such terms will be described in detail in relevant sections of the description. Therefore, it should be understood that the terms used herein should not be simply defined literally but should be defined on the basis of the meanings of the terms and the overall contents of the present disclosure.

1. Battery Pack According to an Embodiment of the Present Disclosure

A battery pack according to an embodiment of the present disclosure may be used to supply power to an external device 500.

In more detail, the battery pack according to an embodiment of the present disclosure is a battery pack of which a BMS can be integrally used by an external device regardless of whether a wake-up signal can be generated.

The external device 500 represents a mobile device such as a mobile computer, a mobile phone, a camera, or the like.

Figure 2:
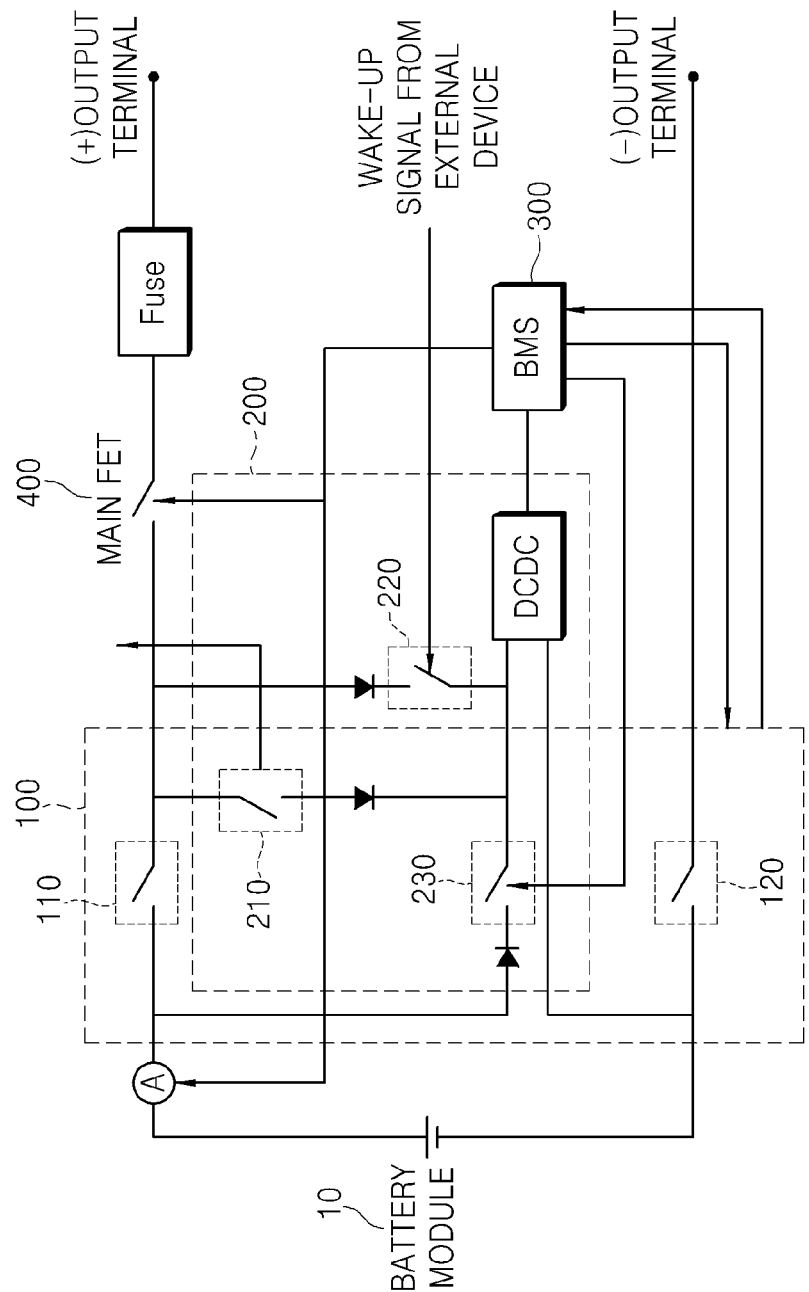
FIG. 2 is an actual circuit diagram of a battery pack according to an embodiment of the present disclosure.

Hereinafter, the battery pack according to an embodiment of the present disclosure will be described with reference to FIGS. 1 and 2.

The battery pack according to an embodiment of the present disclosure may include a plurality of battery modules 10, a BMS 300 which controls charging or discharging of the battery pack, a wake-up control unit 200 which controls wake-up of the BMS, a protection circuit unit 100 which protects the battery pack from an overcurrent, overvoltage, and low voltage, and a main FET 400, one end of which is connected to the protection circuit unit and the other end of which is connected to a positive output terminal of the battery pack.

Meanwhile, the protection circuit unit 100 includes a blocking switch 110, one end of which is connected to a positive terminal of the plurality of battery modules, and the other end of which is connected to the BMS 300 and the main FET 400. The blocking switch 110 receives a blocking signal from the BMS 300 to block an output of the battery pack. The wake-up control unit 200 may control a wake-up circuit of the battery pack according to whether the external device connected to the battery pack is able to generate a wake-up signal for waking up the BMS.

In detail, the wake-up control unit 200 may include a first switch 210, one end of which is connected to the other end of the blocking switch, and the other end of which is connected to the BMS, a second switch 220, one end of which is connected to the other end of the blocking switch, and the other end of which is connected to the external device, and a third switch 230, one end of which is connected to the blocking switch 110, and the other end of which is connected to the BMS 300.

The first switch 210 is in an on state when the external device is unable to generate the wake-up signal for waking up the BMS 300, and is in an off state when the external device is able to generate the wake-up signal for waking up the BMS 300.

In other words, the first switch 210 may be in an on state so that the BMS 300 and the plurality of battery modules 10 constituting the battery pack are constantly connected since the external device is unable to generate the BMS wake-up signal. However, the first switch 210 may be forcibly turned off by a user using the battery pack. For example, when a battery is not used for a long period of time, battery power may be consumed by the BMS 300 if the battery module and the BMS 300 are constantly connected. Therefore, in this case, it may be desirable for the user to directly turn off the first switch to reduce battery power consumption.

Meanwhile, upon receiving the BMS wake-up signal from the external device, the second switch 220 may be turned on so as to connect the other end of the protection circuit unit and the BMS 300.

In detail, the second switch 220 may be turned on by receiving the wake-up signal from the external device, and may connect the battery module and the BMS 300 so as to wake up the BMS.

Meanwhile, in the case where the second switch 220 is turned on only while receiving the wake-up signal from the external device so as to supply power to the BMS via a second switch path, the third switch 230 may be turned on at the same time when the BMS 300 is woken up so as to continue to supply power via a path of the third switch 230 even if the second switch 220 is turned off.

That is, once the BMS 300 is woken up, the BMS 300 may turn on the third switch 230 and may turn on the main FET so as to allow an output of the battery pack to be supplied to the external device.

Meanwhile, the first switch 210 and the second switch 220 may not be in an on state at the same time. This is because the battery management system is unable to perform the above-mentioned functions of the first and second switches normally when both the two switches are in an on state.

For example, if the first and second switches 210 and 220 are in an on state when the external device 500 is able to control power of the battery, power is supplied to the BMS 300 via the first switch 210 even when the external device 500 turns off the second switch 220, and thus power consumption may continuously occur in the battery. To avoid occurrence of this case, a situation in which the first switch 210 and the second switch 220 are turned on simultaneously does not occur.

Meanwhile, when an output of the battery pack is blocked by the protection circuit unit 100, the third switch 230 may be controlled by the BMS 300 so as to be blocked after transmitting a diagnosis signal for the plurality of battery modules to the BMS 300 during a predetermined time.

In detail, according to the related art, when a battery pack enters a state of any one of overcurrent, overvoltage, and low voltage, an output of the battery pack is immediately blocked, and the BMS 300 is also turned off, and is thus unable to monitor a battery pack state after the output of the battery pack is blocked.

To resolve this issue, the third switch is connected to one end of the blocking switch 110 for blocking power of the battery pack and may be turned off in response to control by the BMS 300 after the state of the battery pack is further monitored during a predetermined time (preferably less than several seconds).

That is, an additional power supply line is further provided, which is connected to a front stage of the protection circuit unit 100 for blocking power of the battery pack, so that the diagnosis signal of the battery pack may be monitored even when power of the battery pack is blocked by the protection circuit 100.

Meanwhile, the battery pack according to an embodiment of the present disclosure may further include a DC-DC converter. The DC-DC converter may convert an output voltage of the battery module into a suitable voltage for the BMS, and may be preferably arranged between the wake-up control unit and the BMS.

Following table 1 shows an output of the DC-DC converter according to control of the first and second switches by the wake-up control unit in the battery pack according to an embodiment of the present disclosure.

The output of the DC-DC converter may be supplied to the BMS to wake up the BMS 300.

TABLE 1

| First switch | Second switch | DC-DC converter output |
|---|---|---|
| 0 | 0 | 0 |
| 0 | 1 | 1 |
| 1 | 0 | 1 |

It may be recognized from table 1 that the output of the DC-DC converter is output when either the first switch 210 or the second switch 220 is turned on, and the output of the DC-DC converter is 0 when both the first and second switches 210 and 220 are turned off. For example, when the external device 500 is able to generate the wake-up signal, the first switch 210 is brought into an off (0) state by the user. Here, when the second switch 220 is turned on, the output of the DC-DC converter may be generated via the path of the second switch 220, and thus the BMS may be woken up.

For another example, it may be desirable to allow the second switch 220 to remain in an off state when the external device is unable to generate the wake-up signal. If the first switch 210 is turned on by the user when the second switch 220 remains in an off state, the output of the DC-DC converter may be generated via the first switch path so that the BMS 300 may be woken up.

That is, it may be understood that the battery pack according to an embodiment of the present disclosure may control the output of the DC-DC converter using only one switch among the first and second switches 210 and 220.

Following table 2 shows an output of the DC-DC converter according to control of the first to third switches 210, 220, and 230 by the wake-up control unit in the battery pack according to an embodiment of the present disclosure.

TABLE 2

| First switch | Second switch | Third switch | DC-DC converter output |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |

Operation of the first and second switches shown in table 2 may be the same as the operation of the first and second switches shown in table 1, and thus the following descriptions are focused on the operation of the third switch.

Meanwhile, the third switch may be controlled by the BMS so as to be turned on when the BMS is woken up since either the first switch or the second switch is turned on. Accordingly, the third switch may continuously supply power to the BMS via a third switch path even when the first switch or the second switch is turned off after the BMS is woken up through the first switch or second switch path since the first switch or the second switch is turned on.

For example, when the external device is able to generate the wake-up signal, the first switch is in an off state, and the second switch may be controlled by the external device so as to be turned on. In detail, the second switch may include a relay, and supplies power to the BMS via the second switch path when the relay conducts due to a predetermined current flowing therethrough. As described above, the BMS may be woken up when power is supplied to the BMS, and the woken-up BMS may turn on the main FET and the third switch. Meanwhile, once the BMS turns on the third switch as described above, power is supplied to the BMS via the third switch path, and thus an output is generated from the DC-DC converter regardless of on/off of the first switch or the second switch.

Meanwhile, since one end of the third switch is connected to one end of the blocking switch, power may be supplied to the BMS even when the blocking switch is turned off since a state signal of at least one among overcurrent, overvoltage, and low voltage is detected by the BMS. Here, when the blocking switch is turned off, an output of the battery pack may be blocked.

That is, even when the protection circuit of the battery operates and thus the battery output is blocked (even when both the first and second switches are turned off), the output of the DC-DC converter may be generated since the third switch is turned on, thus enabling the BMS to continue to monitor (power hold function) the battery pack. The protection circuit unit 100 may further include a second blocking switch 120 in addition to the blocking switch 110, wherein one end of the second blocking switch 120 may be connected to a negative terminal of the plurality of battery modules, and the other end may be connected to a negative output terminal of the battery pack. The second blocking switch may be additionally provided as described above in order to prepare for the case where one blocking switch fails and thus does not function normally.

For example, when the battery is in the state of any one of overcurrent, overvoltage, and low voltage, the output of the battery pack is required to be blocked in order to prevent the battery pack and the external device connected thereto from being damaged. However, in the case where only one blocking switch is provided, the output of the battery pack is unable to be blocked even though the output of the battery pack is required to be blocked when the one blocking switch fails, thus causing battery fire, damage to a battery, and the like. Thus, the second blocking switch is additionally provided to prepare for such a situation.

2. Battery Pack Wake-Up Method and Battery Pack Protection Method According to an Embodiment of the Present Disclosure Hereinafter, a battery pack wake-up method and a battery pack protection method according to an embodiment will be described with reference to FIG. 3.

A method for waking up a battery pack and protecting the battery pack upon occurrence of a protection situation according to an embodiment of the present disclosure may include confirming whether an external device to which a battery pack is connected is able to generate a BMS wake-up signal (S100), controlling a first switch and a second switch according to a result of the confirming (S200, S300), connecting a main FET by turning on the main FET to connect an output of the battery pack to the external device when a BMS of the battery pack is woken up, and blocking, by the BMS of the battery pack, the main FET when any one of overcurrent, overvoltage, and low voltage is detected in the battery pack (S400), and turning on a third switch at the same time when the blocking of the main FET is performed by the BMS (S410).

According to the present disclosure, the controlling of the first switch and the second switch may vary according to whether the external device connected to the battery pack is able to generate the BMS wake-up signal.

In detail, during the controlling of the first switch and the second switch (S200, S300), power is supplied to the BMS by turning on the first switch when the external device is unable to generate the BMS wake-up signal. The first switch may be directly operated by a user who uses the battery pack so as to be turned on or off. That is, when the external device is unable to generate the BMS wake-up signal, the user may turn on the first switch so that power may be supplied to the BMS via the first switch. Here, it may be desirable to set the second switch to an off state. Meanwhile, when the external device is able to generate the BMS wake-up signal, turning off, by the user, the first switch and controlling, by the external device, the second switch are performed so that the second switch is turned on upon receiving the BMS wake-up signal from the device to supply power to the BMS (S300).

That is, when the external device is able to generate the BMS wake-up signal, the first switch may be set to an off state, and the second switch may be turned on by being controlled by the external device so as to supply power to the BMS. Meanwhile, when the BMS detects a state of any one of overcurrent, overvoltage, and low voltage and when the BMS generates a blocking signal to block the output of the battery pack, the turning on of the third switch includes operating, by the BMS, a protection circuit unit to block the output of a battery and simultaneously turning on, by the BMS, the third switch for a predetermined time, transmitting a diagnosis signal for a battery module to the BMS via a third switch path, and then turning off, by the BMS, the third switch to block the power supplied to the BMS.

In detail, the third switch has an additional power supply line which supplies power to the BMS and is connected to a front stage of the protection circuit unit for blocking power of the battery pack, and thus even when the power of the battery pack is blocked by the protection circuit unit, a battery pack diagnosis signal may be further monitored by the BMS for a predetermined time.

According to the present disclosure, one type of a battery pack can be used for supplying power to an external device regardless of whether battery power can be controlled from the external device.

Furthermore, according to the present disclosure, a battery pack can be monitored for a predetermined time even when the battery pack enters a state of any one of overcurrent, overvoltage, and low voltage.

Although the technical concept of the present invention has been specifically described according to the above-mentioned embodiments, it should be noted that the above-mentioned embodiments are not for limiting the present invention but for describing the present invention. Furthermore, those skilled in the art could understand that various embodiments can be made within the scope of the technical concept of the present invention.

EXPLANATION OF THE TERMS USED

10: a plurality of battery modules
100: a protection circuit unit
110: a blocking switch
120: a second blocking switch
200: a wake-up control unit
210: a first switch
220: a second switch
230: a third switch
300: BMS
400: a main FET
500: an external device

The invention claimed is:

1. A battery pack, comprising:
   a plurality of battery modules;
   a battery management system (BMS) configured to control charging or discharging of the battery pack;
   a wake-up control unit configured to control wake-up of the BMS;
   a protection circuit unit configured to protect the battery pack from overcurrent, overvoltage, and low voltage; and
   a main field-effect transistor (FET), one end of which is connected to the protection circuit unit, and another end of which is connected to a positive output terminal of the battery pack, to control an output of the battery pack in response to control by the BMS,
   wherein the protection circuit unit comprises a blocking switch,
   wherein one end of the blocking switch is connected to a positive terminal of the plurality of battery modules, and another end of the blocking switch is connected to the BMS and the main FET, so that the blocking switch is set to an on state and then is turned off upon receiving a blocking signal from the BMS to block the output of the battery pack, and
   wherein the wake-up control unit comprises:
   a first switch, one end of which is connected to the other end of the blocking switch and another end of which is connected to the BMS,
   a second switch, one end of which is connected to the other end of the blocking switch and another end of which is connected to an external device, and
   a third switch, one end of which is connected to the one end of the blocking switch and another end of which is connected to the BMS.

2. The battery pack of claim 1, wherein:
   when the external device is unable to generate a BMS wake-up signal, the first switch is set to an on state to provide power to the BMS by connecting the other end of the protection circuit unit and the BMS; and
   when the external device is able to generate the BMS wake-up signal, the first switch is set to an off state.

3. The battery pack of claim 1, wherein the second switch is turned on upon receiving a BMS wake-up signal from the external device to provide power to the BMS by connecting the battery modules and the BMS.

4. The battery pack of claim 1, wherein, when the BMS is woken up by the wake-up control unit, the BMS turns on the main FET and the third switch.

5. The battery pack of claim 4, wherein, when blocking the output of the battery pack when an abnormality signal is detected in the battery pack, the BMS blocks the third switch after receiving a diagnosis signal for the plurality of battery modules via a third switch path by maintaining an on state of the third switch for a predetermined time.

6. The battery pack of claim 1, wherein:
   the protection circuit unit further comprises a second blocking switch in addition to the blocking switch;
   one end of the second blocking switch is connected to a negative terminal of the plurality of battery modules; and
   another end of the second blocking switch is connected a negative output terminal of the battery pack.

7. A method of waking up a battery pack and protecting the battery pack upon occurrence of a protection situation, the method comprising:
   confirming whether an external device to which a battery pack is connected is able to generate a BMS wake-up signal;
   controlling a first switch and a second switch according to a result of the confirming;
   turning on a main field-effect transistor (FET) and a third switch to supply power to a BMS when the BMS of the battery pack is woken up, and connecting an output of the battery pack to an external device;
   blocking, by the BMS of the battery pack, the main FET when any one of overcurrent, overvoltage, and low voltage is detected in the battery pack; and
   turning off the third switch after elapse of a predetermined time after the blocking of the main FET is performed by the BMS.

8. The method of claim 7, wherein:
   when the external device is unable to generate the BMS wake-up signal, the controlling of the first switch and the second switch comprises turning on the first switch to provide the power to the BMS; and
   when the external device is able to generate the BMS wake-up signal, the controlling of the first switch and the second switch comprises turning off the first switch and controlling the second switch so that the second switch is turned on upon receiving the BMS wake-up signal from the external device to provide the power to the BMS.

9. The method of claim 7, wherein, when the BMS detects a state of any one of overcurrent, overvoltage, and low voltage, and when the BMS generates a blocking signal to block the output of the battery pack, the turning off of the third switch comprises:
   blocking the third switch after turning on the third switch for a predetermined time; and
   transmitting a diagnosis signal for a battery module to the BMS via a third switch path.

* * * * *